United States Patent [19]
Potter

[11] 3,874,678
[45] Apr. 1, 1975

[54] SEAL MECHANISMS
[75] Inventor: Charles William Potter, Manchester, England
[73] Assignee: Charles Weston & Company Limited, Pendleton, Salford, Lancashire, England
[22] Filed: May 30, 1973
[21] Appl. No.: 365,329

[30] Foreign Application Priority Data
May 30, 1972 United Kingdom........... 25130/72

[52] U.S. Cl............................. 277/29, 277/DIG. 8
[51] Int. Cl............................................. F16j 9/00
[58] Field of Search .............. 277/29, 28, 3, DIG. 8

[56] References Cited
UNITED STATES PATENTS
2,270,927  1/1942  Browne.......................... 277/DIG. 8
2,834,619  5/1958  McNab............................... 277/28
3,285,614  11/1966  McClenathan................. 277/DIG. 8

Primary Examiner—Samuel B. Rothberg
Attorney, Agent, or Firm—Sughrue, Rothwell, Mion, Zinn & Macpeak

[57] ABSTRACT

The seal mechanism for location around a rotatable shaft or tube through which fluid can be passed, the seal mechanism comprising a stationary annular casing into which fluid is fed and an internal sleeve rotatable with the shaft or tube, there being loaded face type seals between the sleeve member and casing. The sleeve member allows passage of fluid to and from the rotating shaft or tube under the influence of a valve means.

7 Claims, 4 Drawing Figures

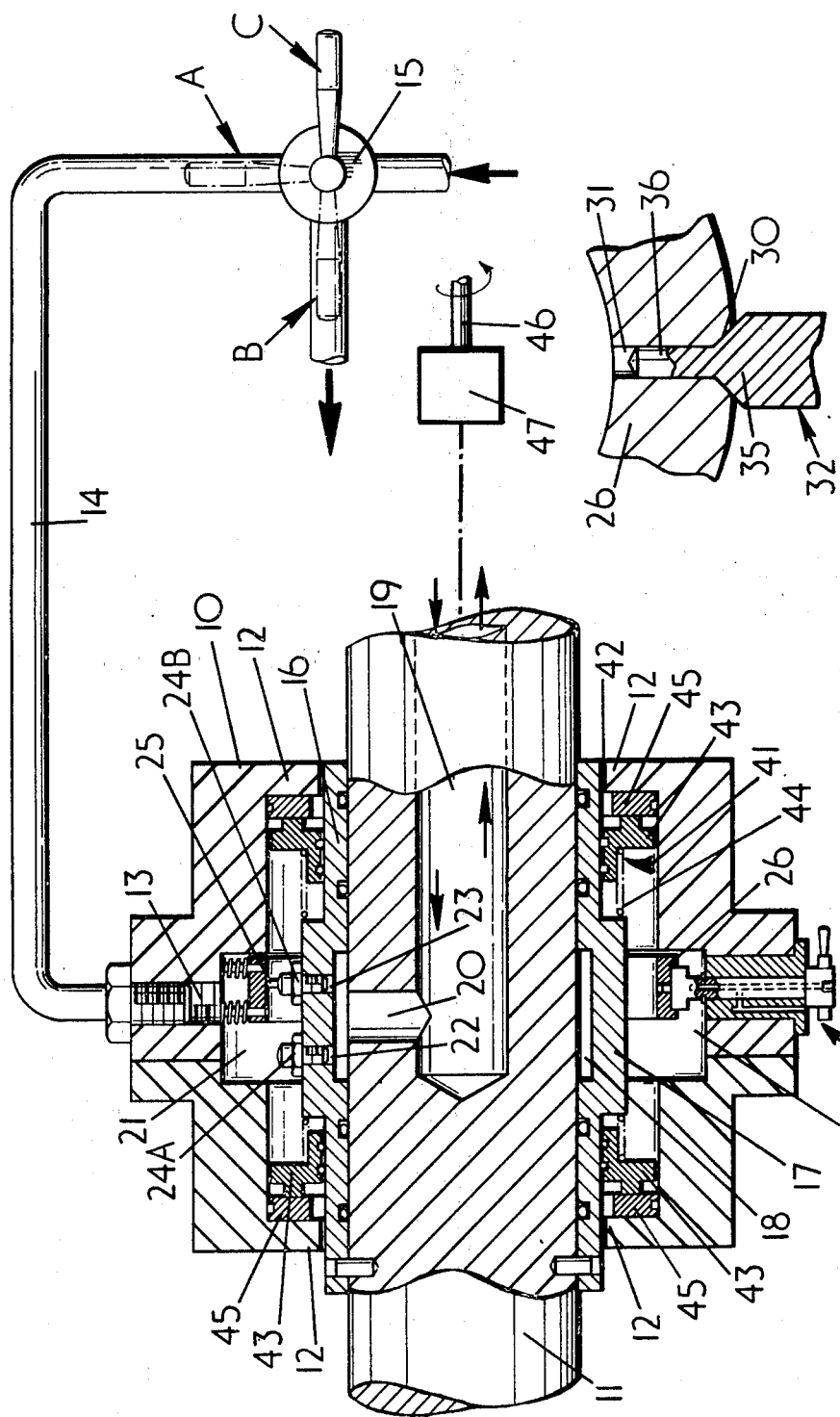

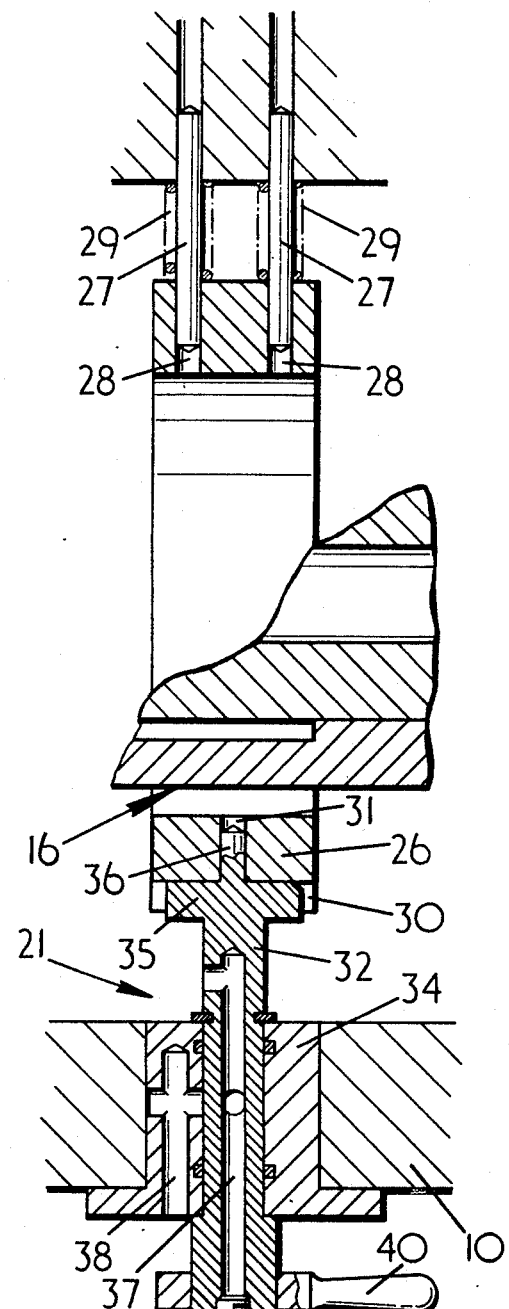
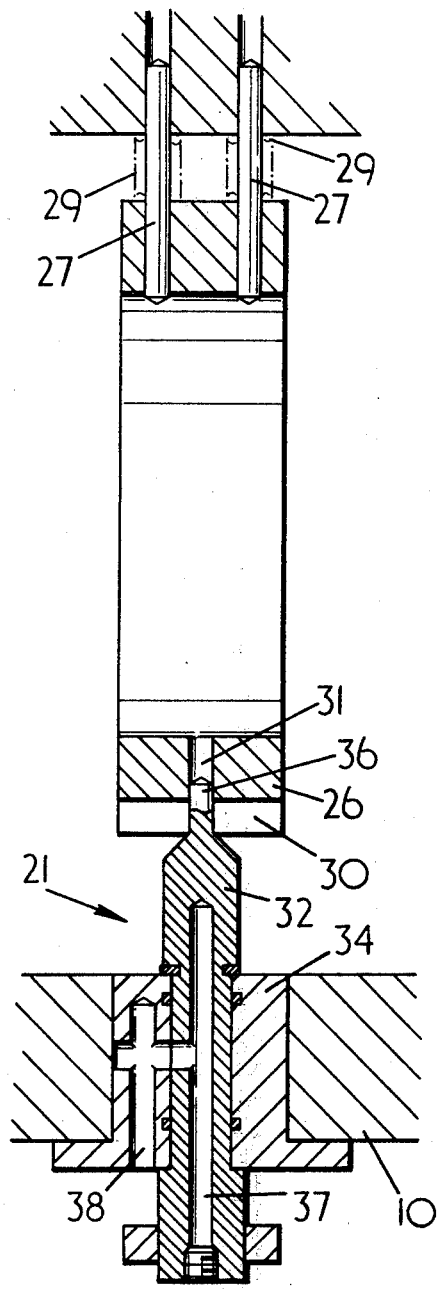
FIG. 3
FIG. 2

SEAL MECHANISMS

This invention relates to a seal mechanism for use in transmitting fluid from a stationary pipe or conduit to a rotating shaft or tube.

The fluid is preferably air but may be gases other than air, or a liquid.

It has been proposed to provide a seal mechanism employing radial face-type seals operating under pressurised fluid load and to provide for dissipation of the resultant heat from the rubbing surfaces by incorporating into the mechanism a water-cooled heat sink.

High load conditions also lead to difficulties of seal face lubrication, and the aforesaid proposal also incorporates means for ensuring adequate lubrication of the seal faces.

The present invention seeks to provide additional improvements to meet the above problems.

According to the present invention there is provided a seal mechanism adapted to straddle or embrace a rotating shaft or tube along which fluid under pressure is to be passed via the seal mechanism, comprising a stationary casing adapted for fluid entry, a sleeve member for rotation with said shaft or tube, and spring-loaded radial face-type sealing means accommodated in a chamber defined by said sleeve member and said carrier for sealing the gap between the casing and the sleeve member, said sleeve member being adapted to permit passage of fluid to and from the rotating shaft or tube under the controlling influence of valve means whereby such passage can be prevented at a predetermined rate for rotation of the shaft or tube thus enabling the pressure in said chamber to be relieved.

One embodiment of seal mechanism in accordance with the present invention will now be described, by way of example only with reference to the accompanying drawings, the seal mechanism being fitted to a rotary shaft having and axial bore communicating with a pneumatically operated clutch device.

In the drawings:

FIG. 1 is a fragmentary sectional view of a seal mechanism according to the present invention and fitted as aforesaid;

FIGS. 2 and 3 are fragmentary sectional views of the sleeve member and its valve means with the latter respectively in the open and closed positions;

FIG. 4 is a detail view of the sleeve member.

The seal mechanism comprises an annular casing 10 encircling a shaft 11 and having end walls 12 extending radially inwardly towards the shaft 11. The casing 10 has an air inlet 13 connected to an air feed pipe 14 connected to a source of air under pressure and equipped with a manually operable air control valve 15 movable between three positions, a "feed" position A in which air under pressure is supplied to the casing 10, an "exhaust" position B in which air is permitted to return from the casing 10 to exhaust, and an "off" position C in which feed or return flow is interrupted.

Within the casing 10 the shaft 11 is embraced by a sleeve member or carrier 16 fast with said shaft 11 and having a central portion 17 of enlarged cross-section to define an annular air entry chamber 18 between the carrier 16 and the shaft 11. The air entry chamber 18 communicates with an axial bore 19 in the shaft 11 by way of a radial passage 20 in the shaft 11 and with a coupling chamber 21, formed by the space between the casing 10 and the carrier 16, by way of two valve-controlled ports 22 and 23. The port 22 is fitted with a centrifugal valve 24A which is normally open and adapted to close at a predetermined rate of rotation of the shaft 11. The other port 23 is controlled by a check valve 24B allowing passage of air to the shaft 11 and having an outwardly projecting stem 25 abutting the inside periphery of an actuating ring 26 encircling the shaft 11 and carrier 16. The actuating ring 26 (see FIGS. 2 to 4) is located in position by a pair of pins 27 anchored in the casing 10 and engaging in a pair of holes 28 in the ring 26, a compression coil spring 29 seating on each pin 27 between the ring 26 and the casing 10. Diametrically opposite the locating pins 27, the actuating ring has on its outside surface a transverse v-section groove 30 and in the centre of the groove 30 a hole 31 extending through the ring 26. A manually rotatable stem 32 of an emergency valve 33 extends through a valve body 34 fitted into the casing and has a head 35 in the form of a cross-piece of wedge-shaped appearance in cross-section (see FIG. 4) which engages in said groove 30. A spigot 36 extending from this head 35 engages and is slidable in the hole 31 in the actuating ring 26. The stem 32 has a bore 37 which establishes communication between the coupling chamber 18 and a passageway 38 to atmosphere in the valve body 34 when the stem 32 is turned by a handle 40 to open the valve 33 (see FIG. 3). Turning of the stem 32 to open the valve 33 forces the wedge-shaped head 35 of the stem 32 out of engagement with the v-section groove 31 in the ring 26 and this causes displacement of the ring 26 along the pins 27 against the spring load 29.

The constraint on the check valve stem 25 is thus removed and this valve opens to release pressurised air from the axial bore 19 of the shaft 11 into the coupling chamber 21 and thence, via the bore 37 of the emergency valve stem 32 and the passageway 38 in the valve body 34 to atmosphere.

The carrier 16 mounts the rotary components of two face type seals 41 for closing the annular gaps 42 between the ends of the casing 10 and the carrier 16. These rotary components comprise, in each case, a rotary sealing ring 43 loaded by a coil spring 44 acting between the sealing ring 43 and an annular abutment surface afforded by said central portion of the carrier 16. Each of the rotary sealing rings 43 is urged by its coil spring 44 into sealing contact with a stationary sealing ring 45 secured to the inside of the respective casing end wall 12.

In use of the seal mechanism and with the driving shaft 46 or flywheel of the clutch device 47, rotating at a low speed, movement of the air control valve 15 to the feed position A will permit passage of air under pressure via the check valve 24B and rotary shaft bore 19 to the clutch device 47 causing the rotary shaft 11 to rotate at the driving shaft speed. Acceleration of the driving shaft 46 to normal speed will result in closure of the centrifugal valve 24A and by manual operation of the air control valve 15 the air in the coupling chamber 21 may be reduced to atmospheric pressure, thereby relieving the load on the rotary sealing rings 43 without loss of pressure in the clutch device 47. Reducing the rotational speed will allow the centrifugal valve 24A to open with consequent loss of pressure in the clutch device 47. Pressure may be restored for low speed rotation by turning the air control valve 15 to the feed position A.

Radial displacement of the actuating ring 26 by operation of the emergency release valve 33 enables an emergency pressure release to be obtained via the check valve 24B.

There may also be provided a pressure release valve (not shown) which is preset to the maximum working pressure and fitted to the coupling chamber 21 accommodating the centrifugal and check valves 24A and 24B. The pressure release valve is used to control excessive pressure rises which may occur as a result of temperature changes in the system.

What is claimed is:

1. A seal mechanism for encompassing a rotatable member having an internal passage open to the rotatable member exterior and along which fluid under pressure is to be transmitted via the seal mechanism, the seal mechanism comprising:
    a. a stationary annular casing surrounding the rotatable member and having radially inwardly directly end walls,
    b. a fluid inlet passage for ingress of fluid to the casing interior,
    c. a co-axial sleeve within the casing and also surrounding the rotatable member for rotation therewith, the casing and sleeve between them defining an annular chamber and the sleeve being provided with two ports for allowing fluid communication between the annular chamber and the internal passage of the rotatable member,
    d. spring-loaded radial face-type sealing means accommodated within the annular chamber for sealing gaps between the casing end walls and sleeve,
    e. a normally-open centrifugal valve in one of the ports and closable at a predetermined rate of rotation of the rotatable member, and
    f. a normally-closed check valve in the other port for releasing fluid pressure from the chamber when the centrifugal valve is closed.

2. A seal mechanism according to claim 1 further comprising means constraining the check valve to a closed position, which means comprises:
    a. an actuating ring within the chamber and against the inner periphery of which a stem of the check valve engages,
    b. resilient means urging the actuating ring against the check valve stem to maintain the check valve closed, and
    c. a rotatable emergency valve mounted in the casing and operatively engaging the actuating ring bodily to move the actuating ring against the action of the resilient means to open the check valve.

3. A seal mechanism according to claim 2, in which the actuating ring has an external wedge-shaped groove formed in its circumference, and the emergency valve has a rotatable stem formed with a bore having ports which, in one angular position of the stem, place the chamber in communication via the bore with atmosphere, and, on the stem, a wedge head engaging in the wedge-shaped groove and disengagable therefrom when the stem is in the said one angular position to move the actuating ring against the action of the resilient means.

4. A seal mechanism according to claim 1 in which the sealing means comprises, in rubbing contact, spring-loaded rotary rings mounted on the sleeve and stationary sealing rings secured to the casing.

5. A seal mechanism according to claim 1, comprising a fluid supply pipe connected to the fluid inlet passage, and a three-position control valve associated with the supply pipe to supply, exhaust, or prevent flow of fluid.

6. A seal mechanism according to claim 2, in which the emergency valve is manually rotatable.

7. A seal mechanism according to claim 5, in which the three-position control valve is manually operable.

* * * * *